(No Model.)
W. E. SHOEMAKER.
ANTIFRICTION BEARING.
No. 541,574.            Patented June 25, 1895.
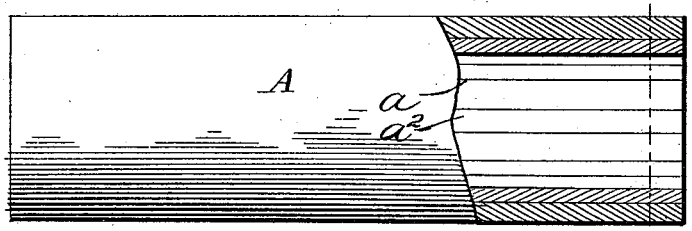
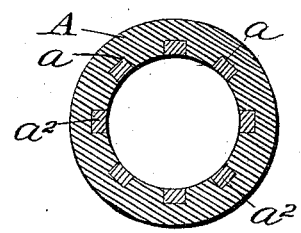
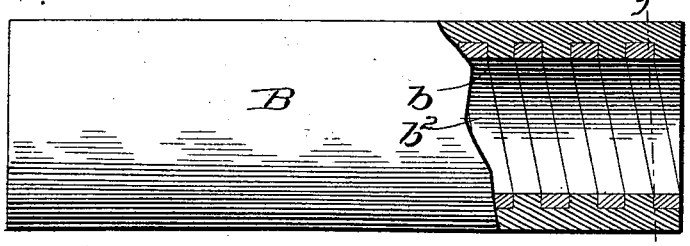
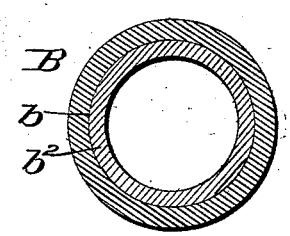
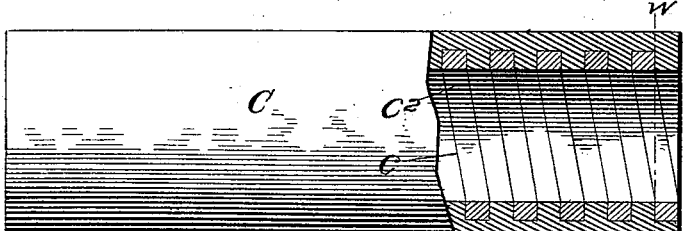
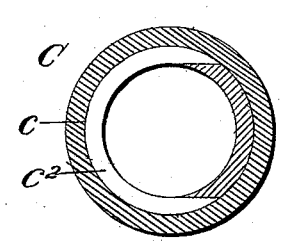
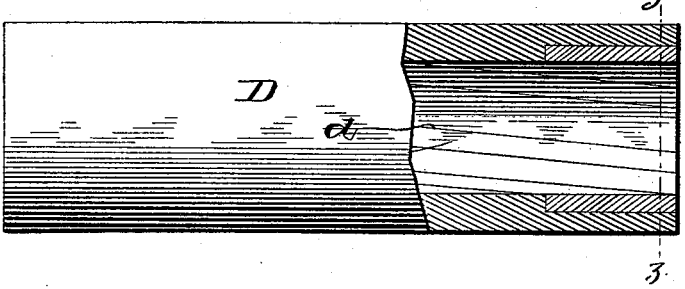
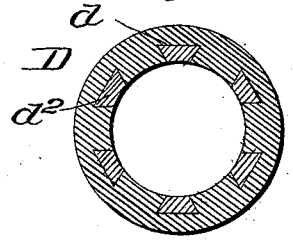
WITNESSES:
INVENTOR
William E. Shoemaker
BY
ATTORNEYS
THE NORRIS PETERS CO., PHOTO-LITHO., WASHINGTON, D. C.

UNITED STATES PATENT OFFICE.

WILLIAM E. SHOEMAKER, OF BRIDGETON, NEW JERSEY.

ANTIFRICTION-BEARING.

SPECIFICATION forming part of Letters Patent No. 541,574, dated June 25, 1895.

Application filed January 23, 1895. Serial No. 535,866. (No model.)

*To all whom it may concern:*

Be it known that I, WILLIAM E. SHOEMAKER, a citizen of the United States, residing at Bridgeton, in the county of Cumberland and State of New Jersey, have invented certain new and useful Improvements in Antifriction-Bearings, of which the following is a specification.

The invention relates to anti-friction bearings.

The object of the invention is to produce a bearing of this class, possessing advantages in point of cheapness, durability and general efficiency.

With this object in view, the invention consists in an improved construction and certain novel combinations and arrangements of parts to be hereinafter described and claimed.

In the accompanying drawings, forming part of this specification, similar letters of reference indicate corresponding parts in the several views.

Figure 1 is a view in vertical longitudinal section of a bearing constructed in accordance with my invention. Fig. 2 is a cross-sectional view of the same, taken on the line $xx$ of Fig. 1. Fig. 3 is a vertical longitudinal section of a modified arrangement of the parts. Fig. 4 is a cross-sectional view of the same, taken on the line $yy$ of Fig. 3. Fig. 5 is a vertical longitudinal sectional view of a second modification. Fig. 6 is a cross-sectional view of the same, taken on the line $ww$ of Fig. 5. Fig. 7 is a vertical longitudinal section of a third modification. Fig. 8 is a cross-sectional view of the same, taken on the line $zz$ of Fig. 7.

In the drawings, A, represents a bearing or bushing of graphite composition or other suitable material, in which one or more channels or grooves $a$, are formed to receive strips $a^2$, preferably of Babbitt metal. These strips are embedded in the graphite cylinder to a depth sufficient to bring their inner faces flush with the graphite surface in the bore of the bushing, in which position they will tend to take up the weight and strain of the shafting, as well as to serve effectually as a support and thereby lengthen the life of the bearing. In employing Babbitt metal strips, the self-lubrication of the bearing is greatly facilitated and friction and heating thereby avoided.

As shown in Figs. 1 and 2, the strips lie embedded in equi-spaced grooves, which extend parallel with the axis of the bushing.

In Figs. 3 and 4, the bore of the bushing B, is shown grooved, as at $b$, to receive a series of equi-spaced rings $b^2$, which are embedded therein as above described, and arranged at an angle to the axis.

In Figs. 5 and 6, a helical groove $c$, is formed in the bushing C, and embedded therein so as to lie flush with the bore or bearing surface is a continuous helical strip of metal $c^2$.

In the further modification illustrated by Figs. 7 and 8 the bore of the bushing D, is grooved as at $d$ to receive a series of equi-spaced parallel metal strips $d^2$. These strips, differing from those above described, are of a shape in cross section to lie dove-tailed in the grooves, this being one of many shapes the strips may be given in cross section.

In the manufacture of the combined graphite composition and metal bushings, the strips of a determined number and shape are placed in a mold, and after being firmly secured, the graphite composition is pumped in and the pressure then applied, which results, after the casting has become set or hardened, in so uniting the metal and composition, as to make them practically one piece and thereby insures against the strip or strips working loose.

Prominent among the many advantages of the invention may be mentioned its extreme simplicity, cheapness, and efficiency in lengthening the life of graphite bearings.

Having thus fully described my invention, what I claim is—

A bushing the body of which is composed of a graphite composition cylinder grooved internally and metallic filling securely placed in such grooved portion so as to be flush with the internal graphite surface.

In testimony whereof I have hereunto affixed my signature in the presence of two subscribing witnesses.

WILLIAM E. SHOEMAKER.

Witnesses:
JOHN F. TURNER,
SARAH A. C. LOYD.